United States Patent [19]

McCord et al.

[11] 4,279,317

[45] Jul. 21, 1981

[54] MAGNETIC COUPLING FOR A WEIGHING BALANCE ASSEMBLY

[75] Inventors: Dick P. McCord; Mark E. Eberhardt, Jr., both of Troy, Ohio

[73] Assignee: Hobart Corporation, Troy, Ohio

[21] Appl. No.: 80,803

[22] Filed: Oct. 1, 1979

[51] Int. Cl.³ ............................................ G01G 23/10
[52] U.S. Cl. ............................... 177/185; 177/DIG. 5
[58] Field of Search .................. 177/185, DIG. 5, 187

[56] References Cited

U.S. PATENT DOCUMENTS

| | | | |
|---|---|---|---|
| 3,123,165 | 3/1964 | Carson, Jr. et al. ............. | 177/185 X |
| 3,617,370 | 11/1971 | Myers ................................... | 177/185 |
| 3,685,603 | 8/1972 | Codina ............................ | 177/185 X |
| 4,211,295 | 7/1980 | Gallo .................................... | 177/185 |

Primary Examiner—George H. Miller, Jr.
Attorney, Agent, or Firm—Biebel, French & Nauman

[57] ABSTRACT

A magnetic coupling between the sample support shaft and the internal weighing mechanism of a weighing balance assembly is provided which permits transverse movement of the shaft when it or a sample supported by it are bumped or jarred. Generally, the internal weighing mechanism of a weighing balance is quite sensitive to the unavoidable bumping and jarring which occurs during the loading and unloading of a sample. Because the magnetic coupling permits movement of the shaft, no damaging forces or torques are transmitted to the weighing mechanism. The magnetic attraction between the shaft and coupling is sufficient to insure that the shaft remains in an upright position during normal operation.

5 Claims, 5 Drawing Figures

MAGNETIC COUPLING FOR A WEIGHING BALANCE ASSEMBLY

BACKGROUND OF THE INVENTION

This invention relates to a magnetic coupling device for coupling the weight bearing stem of a weighing balance to the internal mechanism of the balance, and more particularly to a magnetic coupling device for use in a meat analyzer as disclosed in copending application Ser. No. 080,802, filed Oct. 1, 1979 and entitled "Method and Apparatus for Analysis of Meat Products," and Ser. No. 080,841, filed Oct. 1, 1979 entitled "Use of Acid as an Analysis Aid in Salted Meat Samples," both filed on even date herewith.

Precision weighing balance mechanisms are quite sensitive to abrupt changes in weight loads such as are caused by the loading and unloading of samples, the removal and insertion of sample holders and the like, and accidental bumps and jars by the operator of the weighing platform. Where the weighing platform is connected to the internal weighing mechanism by means of an elongated single shaft force transmitting element, the almost unavoidable bumping or jarring of the platform during sample loading and unloading or insertion and removal of holder parts causes potentially damaging movements, torques, and/or forces to be transmitted by the shaft to the internal weighing mechanism. Particularly in devices where a relatively long shaft is required, such as the meat analyzer disclosed in copending application Ser. No. 080,802, entitled "Method and Apparatus for Analysis of Meat Products" filed on even date herewith, the internal weighing mechanism is highly vulnerable to even slight bumps and jars which unavoidably occur during removal and loading of a sample.

Accordingly, the need exists for a means which will eliminate or at least substantially reduce the transmission of damaging forces and torques by the shaft from a weighing platform to the internal mechanism of a weighing balance assembly.

SUMMARY OF THE INVENTION

The present invention meets that need by providing for a magnetic coupling between the shaft and the internal weighing mechanism which permits transverse movement of the shaft when it is bumped or jarred. Because the shaft is no longer rigidly attached to the weighing mechanism, no damaging forces or torques are transmitted when the shaft or attached weighing platform are jarred. Rather, the shaft moves transversely in response to a force applied normal to its long axis. The magnetic attraction between the shaft and the coupling is sufficient to insure that the shaft remains upright during normal weighing operations and returns to an upright position after encountering a sideways bump or jar.

In a preferred embodiment of the invention, the magnetic coupling is utilized to connect a sample support shaft to a weighing mechanism in a meat analyzing device. The meat analyzer determines the fat, moisture, and protein content of samples by heating them with microwave energy in an oven to drive off moisture as water vapor and render fat as a liquid which is collected and separately weighed. The weighing balance assembly is located exteriorly of the microwave oven and is used to measure the weight of meat samples before, during, and after cooking.

The upper portion of the sample support shaft which extends into the oven through a choke seal in the base thereof is fabricated of a plastic or ceramic material which is not affected by microwave energy. This upper portion of the shaft is secured to a lower ferromagnetic portion of the shaft which forms a part of the magnetic coupling. Attached to the internal weighing mechanism of the balance assembly and extending therefrom is a holder which has a permanent magnet seated therein. The holder has a generally cylindrically shaped opening into which the lower portion of the sample support shaft is fitted and coupled to the magnet.

The sidewalls of the holder are flared outwardly to permit the shaft to rock from the vertical while remaining coupled to the magnet. The diameter of the choke seal opening in the base of the oven is such that the shaft has sufficient clearance to rock slightly when jarred or bumped.

Accordingly, it is an object of the present invention to provide a magnetic coupling device which eliminates or substantially reduces the transmission of damaging forces and torques by a sample support shaft to the weighing mechanism of a weighing balance assembly. This and other objects and advantages of the invention will become apparent from the following description, the accompanying drawings, and the appended claims.

DESCRIPTION OF THE PREFERRED EMBODIMENTS

Figure 1:
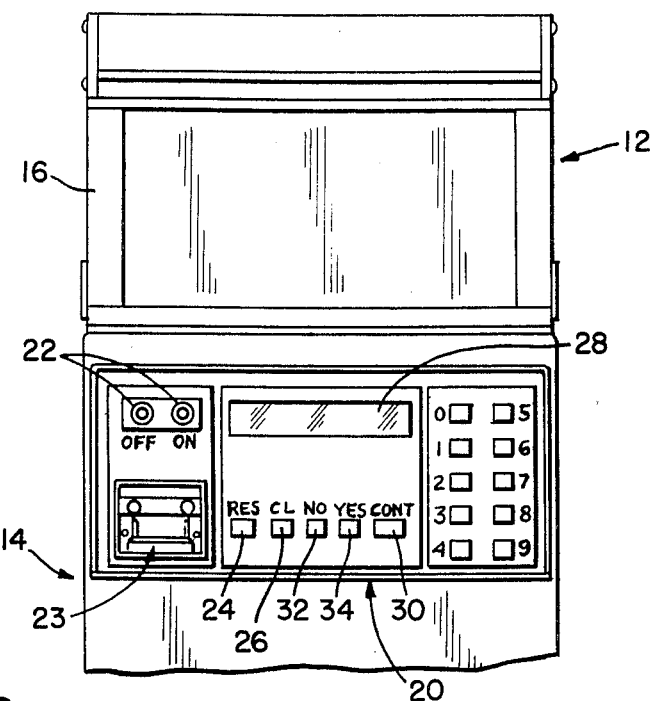
FIG. 1 is a front view of the apparatus of the present invention illustrating the control panel and microwave oven.

Although the present invention will be described in terms of its use in a meat analyzing device, it will be apparent to those skilled in the art that the invention is broadly applicable to use in weighing devices having a weighing platform or sample support element separated from the weighing mechanism by an elongated single shaft force transmitting element.

Analysis of food material, such as prepared samples of a meat product, is provided by rendering or "cooking" the sample to release from it moisture, primarily in the form of vapor, and fat, primarily as liquid which is collected separately from the solid residue and removed from the scale to avoid fluctuations in weight readings. By weighing the sample before and after cooking, and both with and separate from the fat, it is possible to calculate percentage of moisture and percentage of fat. Having reference to certain formulae which are well known in the meat industry, it is possible to calculate the percentage of protein in meat.

In a preferred embodiment, a comminuted meat sample is selected such that the sample weight is in the range of 70 to 80 grams. The reason for this is that the "cooking" cycle may be maintained short, e.g., 2 to 4½ minutes. The term "cooking" in accordance with this invention is meat heated short of charring but far too well cooked to be edible in the normal sense. The use of microwave energy offers the singular advantage of generating heat throughout the sample so that it is uniformly and evenly heated. The energy from the source penetrates the sample causing oscillation of dipolar molecules, such as water, which attempt to align themselves with the polarity of the electromagnetic field, and thereby generate heat uniformly throughout the sample. The moisture, or water is vaporized and released directly as vapor. The fat molecules are excited sufficiently by the microwave energy to cause melting of the fat which then drips from the sample into a collection dish. By heating the sample short of charring, decomposition of substantial amounts of protein and fat is avoided even though some fat, moisture, and protein remains in the solid residue.

The microwave cooking thus does not remove all of the fat or moisture, but this has been found not to be critical to the determination of the percentages of these components as taught in above-mentioned U.S. Pat. Nos. 3,890,825 and 3,916,670. It has also been observed that some of the protein is removed with the moisture by decomposition and vaporization. These factors are compensated for by generating a set of constants which are a function of oven design, i.e., spacing between the microwave energy source and sample, intensity of energy source, and rate of heating and type of meat. Also a factor is the loss of fat, protein, etc., due to spattering and the vaporization of some of these components. Thus, any microwave oven will have a set of constants which can be calculated, the constants being determined easily by a simple calibration procedure, and being valid for each oven of the same design, although it may vary from one design of oven to the next. The procedure for developing such constants is discussed in the above-mentioned patents and is incorporated herein by reference. Those sampling techniques and use of multiple regression analysis have been extended to include the determination of constants for salt content and temperature in the present invention.

In general, the analysis system operates as follows. The sample holder assembly, sample holder, and sample holder cover are first weighed to establish an initial tare weight which is then stored. The fat collection dish is then lowered onto the sample holder assembly and weighed to establish a second combined tare weight which is stored. (It should be understood that whenever "collection dish" is mentioned, this also includes a dish paper and watchglass which are contained in the collection dish and help to prevent spattering.) The collection dish is then raised off of the sample holder assembly in preparation for the cooking cycle. A prepared sample of meat is then placed in the sample holder, covered, and loaded onto the sample holder assembly. After measuring and storing the weight of the sample plus the initial tare weight, the cooking cycle is initiated and continued until the rate of weight loss of the sample falls below a predetermined value. During the cooking cycle, the fat collection dish is maintained off the sample holder assembly so that the rendered fat it collects does not cause any fluctuations in weight readings. At the end of the cooking cycle, the oven is shut off and the fat containing collection dish is lowered into the sample holder assembly where the combined weight of the sample holder assembly, sample holder, sample holder cover, collection dish, sample residue, and rendered fat is recorded. The residue is then removed from the balance and the combined weight of the sample holder assembly, sample holder, sample holder cover, collection dish, and rendered fat is recorded. The moisture, fat, and protein content of the sample may then be calculated using equations which will be set forth below.

As is understood, these calculations may be automatically carried out by a computer which functions with the balance assembly in a conventional manner.

It will be apparent to those skilled in the art that the present system may be used to determine only fat content in contrast to determination of each of moisture, fat, and protein, or may be used to determine only moisture. If used to determine only protein, this can be done by determining fat and moisture but reporting only the protein results.

Various types of electronic means known to a person skilled in the art may be used to perform the weighing and calculating functions previously described. For example, a number of commercially available balances provide digital output of weight information which is easily processed in a small general purpose or special purpose computer. With such equipment the calculations are carried out manually or under the control of a set of instructions programmed into the computer.

It has been discovered that a more nearly automatic system can be provided wherein the weighing, recording, and cooking operations are performed in a fairly rapid manner, and with minimum attention which can be provided by relatively unskilled labor. This system also provides certain additional manufacturing advantages since it minimizes the need to standardize each type of oven used. The system also provides both an automatic visual readout of percentages of moisture, fat, and protein, and a printout of this information.

Figure 2:
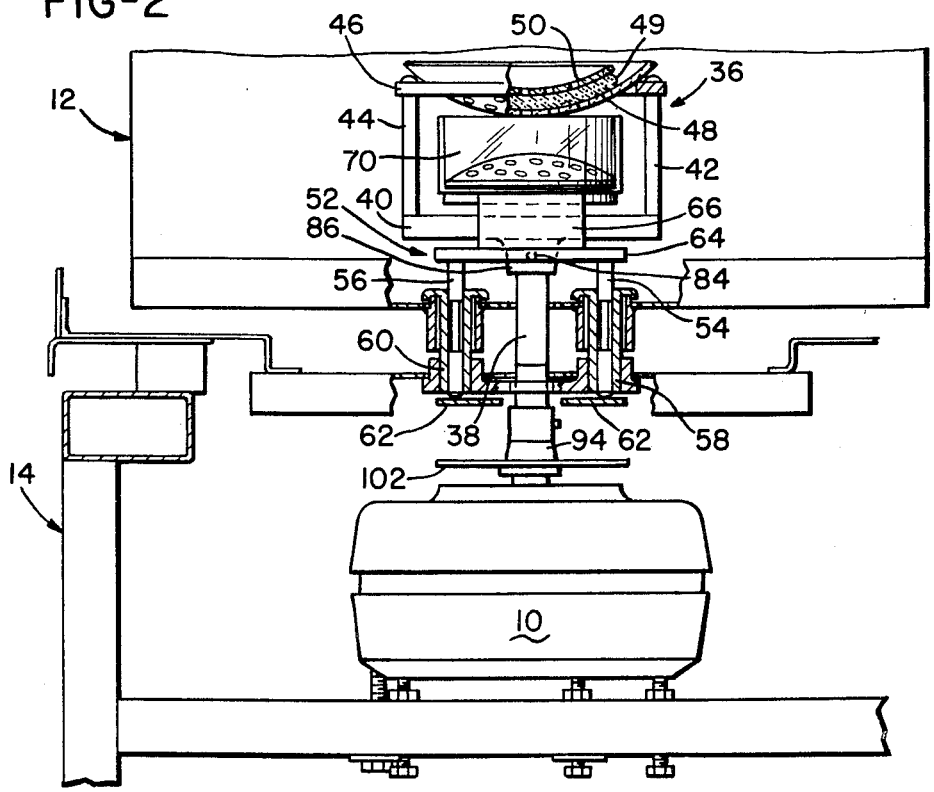
FIG. 2 is a view of the weighing apparatus, sample holder assembly, and fat collecting dish and dish support assembly in their respective positions during the cooking of the sample.

Referring now to FIGS. 1 and 2, this automated system includes a weighing balance assembly 10 incorporated beneath a microwave oven 12 which is supported on a suitable cabinet 14. The oven is a standard type of microwave oven using a magnetron with a frequency of 2450 megahertz, although frequencies of between 900 to 2500 megahertz may be used. This oven may be basically the same as a Model M312 microwave oven commercially available from the Hobart Corporation.

Oven 12 includes a hinged door 16. Below the oven on cabinet 14 is a control panel 20 which includes a master power (ON-OFF) switch 22 as well as the following controls. RESET switch 24 interrupts the program and returns control to the start of the program. CLEAR switch 26 clears any digits displayed in a window 28. CONT switch 30 when touched indicates that a command has been completed and continues the program to the next command. By touching switches NO 32 or YES 34 an operator can answer questions displayed in window 28. Finally, numbers entered into the program by touching digit switches 0–9 will be displayed in the window 28. A printer 23 records and displays information on a paper ticket.

Figure 5:
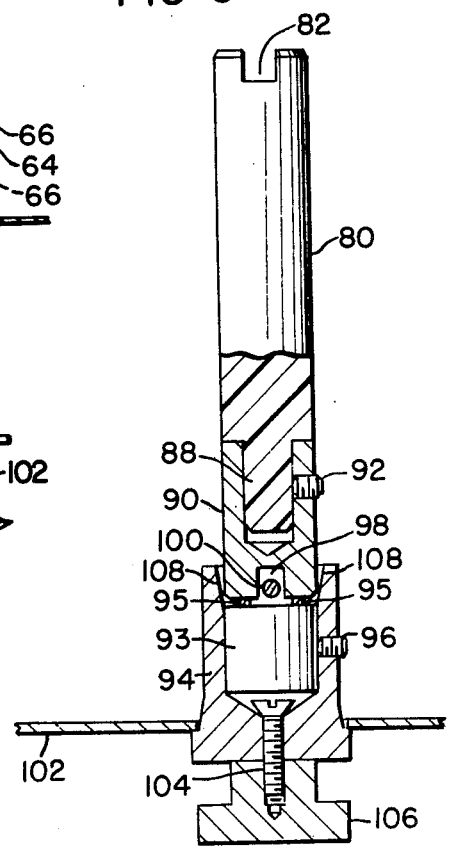
FIG. 5 is a detailed sectional view of the magnetic coupling of the stem of the weighing balance to the base thereof.

The weighing balance assembly 10 includes a precision balance such as a modified Model 5300 top loading balance commercially available from the Voland Corporation of New Rochelle, New York, having a sample holder assembly 36 mounted within the oven cavity on the pedestal stem 38 of the balance. As best illustrated in FIG. 5, the upper portion 80 of stem 38 is fabricated of a plastic, such as polypropylene, or other material substantially unaffected by microwave energy. At the upper tip of stem 38 is a slot 82 which is adapted to straddle pin 84 in boss 86 (illustrated in FIGS. 2 and 3) to provide proper alignment of the sample holder assembly 36 in the system.

The opposite tip 88 of upper portion 80 of the stem is adapted to fit into a hole bored in lower portion 90 of stem 38 and is held therein by suitable means such as set screw 92. Lower portion 90 of stem 38 is fabricated of a ferromagnetic material and is magnetically coupled to magnet 93 having poles 95 and seated in holder 94. A suitable magnet for use in the device has been found to be a BM-1908×¾ magnet commercially available from Bunting Magnetics Co., Elk Grove Village, Illinois. The magnet is held in place by suitable means such as a set screw 96. Stem 38 is maintained in proper alignment in holder 94 by means of slot 98 which straddles pin 100. A disc-like shield 102 protects the weighing mechanism from any possible fat drippings which may inadvertently escape from the oven. Holder 94 is secured by suitable means such as screw 104 to the balance mechanism 106.

As shown in FIG. 5, the upper portion 108 of the inner wall of holder 94 flares outwardly at an angle of about 7.5° from vertical to permit stem 38 to rock slightly away from the vertical while in the holder. The vertical movement of the stem is limited by the clearance between the stem and a ¼ wavelength choke seal which substantially eliminates any leakage of microwave energy from the opening in the oven bottom wall. Typically, this clearance is about ¼ inch. Thus, the magnetic coupling normally maintains the stem in a desired vertical position while still permitting a slight rocking motion of the stem relative to the magnet. This rocking motion, without magnetically uncoupling the stem, avoids the problem of transmitting possibly damaging forces or torques to the internal mechanism of the weighing device. The attraction between the magnet 40 and the metallic lower portion of the stem insures that the stem will return to vertical once any external forces such as bumping or jarring have been removed from the stem and sample holder assembly.

Although a weighing balance having the weighing platform separated from the body portion by an elongated single shaft force transmitting element as does the Voland device is preferable for the present apparatus, it is possible to employ other forms of weighing apparatus including balances of the type wherein the force transducer is located inside the microwave oven cavity and only electrical wires are conducted to the cavity exterior if suitable changes are made in the apparatus. Balances which are totally mounted in the oven cavity and conduct electrical signals to the exterior would for example require suitable shielding and filtering devices to protect the balance transducers from microwave heating and to prevent microwave radiation from being conducted to the exterior of the heating cavity by the balance signal wiring.

Sample holder assembly 36 includes a base member 40 having a suitable connecting means such as boss 86 and pin 84 for releasably attaching the assembly to stem 38 of the balance. Boss 86 consists of a hollow shaft which fits over stem 38 and contains an alignment pin 84 to properly align the assembly on the stem. A pair of upstanding end walls 42 and 44 support an annular disc 46 which is attached thereto. The opening in disc 46 is proportioned to receive a sample holder 48 which may be a perforated watchglass. As illustrated in FIG. 2, a sample 49 of prepared meat is placed on sample holder 48 and is then covered by a sample holder cover 50. Preferably, sample holder cover 50 is also perforated to permit the escape of moisture from the sample as vapor during the cooking cycle. Both holder 48 and cover 50 may be formed of Pyrex glass or polytetrafluoroethylene (Teflon, a trademark of the duPont Company) or other suitable material which is nonresponsive (i.e., not heated) or only mildly responsive to microwave electromagnetic energy.

Also associated with weighing balance assembly 10 is a dish support assembly generally indicated at 52. This assembly includes a pair of vertically extending shafts 54 and 56 which extend through bushings 58 and 60, respectively, and rest on platform 62. Bushings 58 and 60 extend through the base of oven 12 into cabinet 14 and are sealed in the same manner as stem 38 to prevent leakage of microwave energy from the oven during operation. An annular disc-shaped support element 64 is attached to shafts 54 and 56 and surrounds stem 38. It has mounted on opposite sides thereof, a pair of upstanding members 66 and 68 which are adapted to support a dish 70.

Figure 4:
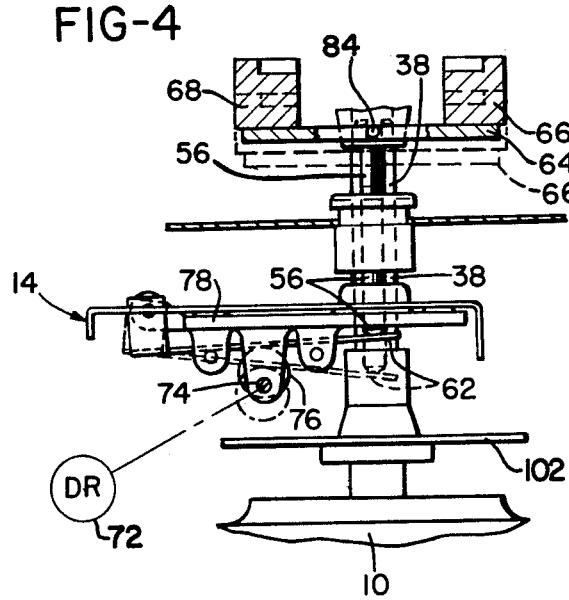
FIG. 4 is a side view of the mechanism which raises and lowers the dish support assembly.

Dish support assembly 52 is raised or lowered by raising or lowering platform 62. As best shown in FIG. 4, this is accomplished by a drive means 72 suitably connected to a shaft 74 which turns cam 76. Cam 76 is in direct contact with the underside of platform 62. Rotation of cam 76 causes platform 62, which is hinged at one end to support member 78 which is attached to a portion of cabinet 14, to raise and lower shafts 54 and 56. A limit switch (not shown) cuts off drive means 72 when the upper or lower (shown in dashed lines in FIG. 4) limit of platform movement is achieved.

Figure 3:
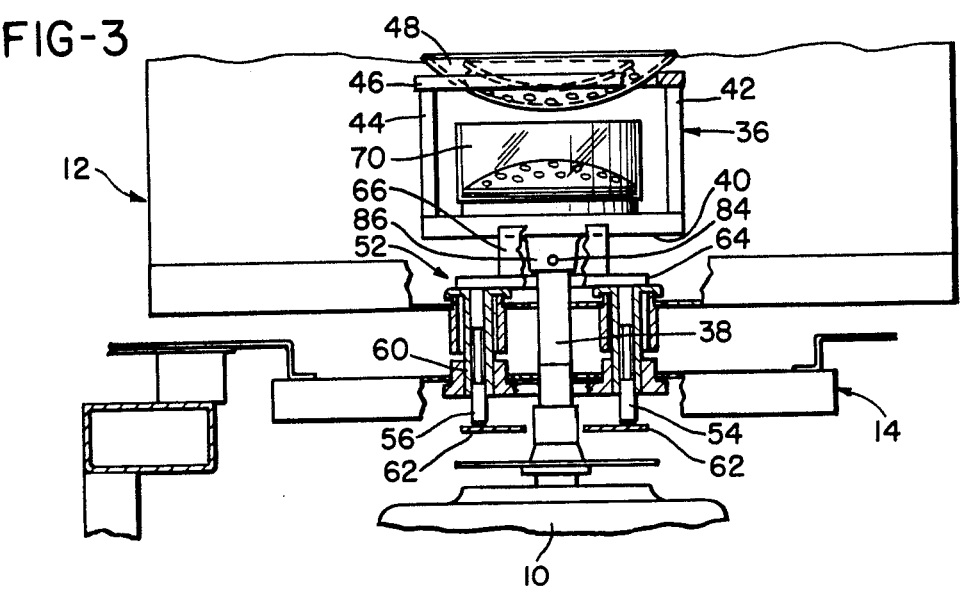
FIG. 3 is a view of the portion of the apparatus shown in FIG. 2, with the various elements shown in their respective positions after cooking has been terminated.

In this manner, dish 70 is raised off of sample holder assembly 36, as shown in FIG. 2, during the cooking cycle. Fat rendered from the sample during cooking is collected in dish 70 off of the weighing scale, avoiding erratic fluctuations in weight readings caused by explosions and spattering or dripping of the hot fat in the dish. After the cooking cycle has been terminated, dish 70 is lowered onto sample holder assembly 36 as shown in FIG. 3 where it is weighed.

The weighing balance device includes a digital electronic output and a microprocessor-controller as taught in the above-mentioned U.S. Pat. Nos. 3,890,825 and 3,916,670. The microprocessor-controller properly sequences the operation of the device and provides outputs to the display window 28 and printer 23. The operation of the microprocessor-controller is detailed in the above-mentioned patents and is herein incorporated by reference.

To commence operation for fresh meat analysis, the power is turned on by pressing ON switch 22. Then, the date, run number, meat type code, and temperature of the prepared sample are successively entered by the operator alternatively touching the appropriate digit switches and then the CONT switch 30 on the control panel. The microprocessor is programmed to utilize different predetermined values of slopes and intercepts in calculating the final percentages of fat, moisture, and protein in the sample. By entering the coded meat type (i.e., beef=0, pork=1, etc.) the microprocessor utilizes proper values for that particular type of meat for the calculations.

After this preliminary information has been entered, the command "PREPARE OVEN" is displayed in window 28. Then, the operator opens the oven door 16 and loads the sample holder assembly 36 including the sample holder 48 and sample cover 50 onto the weighing balance. At this time, also, collection dish 70 is loaded onto dish support assembly 52 which is in a raised position. After the operator closes the door 16 and touches CONT switch 30, a first tare weight (denoted SPT) of the sample support assembly, holder, and cover is taken and stored. The dish support assembly is then lowered causing dish 70 to be deposited onto the base member 40 of the sample holder assembly and a second tare weight (denoted S and D) which includes the weight of the collection dish is taken and stored. The microprocessor makes a calculation to confirm that the weight value of the collection dish (denoted as DSH) is within predetermined expected limits and that the operator has placed the dish on the dish support assembly. (The weight value DSH is not saved by the microprocessor.) When this check is completed, the microprocessor causes the dish support assembly 52 to be raised so that the dish 70 is off of the sample holder assembly base member 40. Each actuation of the dish support assembly 52 to raise or lower the dish 70 is controlled by the microprocessor through its selective operation of the drive means 72 in a conventional manner.

Once the tare weights are recorded, the dish weight check performed, and the dish 70 raised off the weighing assembly 10, the microprocessor then displays a "LOAD SAMPLE" command on display window 28. Then, the operator loads a prepared sample between sample holder 48 and sample cover 50. Samples of fresh meat are prepared by grinding a sample through a conventional meat grinder and then mixing it to obtain a uniform composition. For best results, both the amount of mixing and temperature of the sample are controlled to enable accurate calibration of the analyzer and accurate sample analysis. It has been found that mixing for about 30 seconds at from 30°-50° F. produces satisfactory results.

After the operator closes the oven door 16 and touches the CONT switch 30, the microprocessor then performs a check to ascertain that the sample weight is within the desired range, for example 70 to 80 grams. First, the weight of the sample and sample holder assembly (denoted SAM and SPT) are taken and the initial sample weight calculation, $SAM = (SAM+SPT)-SPT$, is performed. If the sample weight should be above or below the desired range, the weight is displayed to the operator with the message "RELOAD". The operator is then required to adjust the sample weight to the proper range and again touch the CONT switch 30 to initiate the checking procedure. Once the sample weight is found to be within the proper range, the calculated weight value for the sample (SAM) is stored.

The operation for the analysis of a salted meat sample differs slightly from fresh meat analysis operation. This is due to the fact that meat proteins, as with many food proteins, have the ability to bind or encapsulate fat in an emulsion. The addition of salt to meat blends in meat processing operations aids in solubilizing the meat proteins and enables a greater amount of binding of fats. Likewise, temperature is an important factor in forming emulsions in a blended meat product, with higher temperatures (i.e., 50°-60° F.) producing more stable emulsions as opposed to lower temperatures (i.e., 30°-40° F.). Thus, varying the salt content, temperature, and amount of mixing of any meat blend varies the amount of fat bound in a meat sample of this blend and varies the resulting amount of fat rendered from a sample during heating. Accurate calibration becomes impossible for salted and blended samples which have undergone an indeterminate amount of mixing at an unknown temperature in the processing operation and during sample preparation. Thus, all sample preparations for a finished sample should be carried out for a definite time (i.e., 30 seconds to 1 minute) and at a temperature between 30° and 50° F.

In order to standardize the fat binding characteristics of salted blended meat samples, acid is added to the samples in an amount sufficient to lower the pH of the sample below the isoelectric point of the protein in the meat. At a pH below the isoelectric point, meat proteins have much less binding effect on fat and moisture, and the effects of the addition of salt to the meat can be counteracted.

It has been found that the use of citric acid for this purpose produces satisfactory results from the standpoint of ease of handling and production of samples from which accurate calibration measurements can be taken, although other acids may be utilized. A preferred form of citric acid is an encapsulated citric acid product commercially available from Durkee Foods, Inc. under the name Durkote citric acid (SR) (small granular). For use in this invention, the encapsulated acid is packaged in the form of a pillow or capsule. The citric acid is encapsulated in a fatty material which melts at 145°-150° F. Thus, the citric acid product may be mixed with a meat sample and the desirable pH lowering effect of the acid taken advantage of during cooking of the sample. It has been found that the addition of about 3 grams of this acid product to a 70-80 gram sample of meat produces satisfactory results.

In operation, the appropriate meat type code (i.e., blend=2, blend with water=3) is entered and the microprocessor utilizes the proper calibrated constant values for the program commands and required calculations. In addition to entering the appropriate meat type code, run number, and sample temperature, the operator must input the percentage of salt (salt weight divided by meat weight) in the sample to be analyzed.

The operator then prepares the oven as described above. However, when the CONT switch 30 is touched, the display window 28 will indicate "PRE-LOAD SAMPLE" instead of "LOAD SAMPLE" as described above. As before, the operator places the prepared meat sample on the sample holder assembly and by touching the CONT switch causes the microprocessor to read the balance weight measurement, SAM+SPT, calculate the sample weight, $SAM = (SAM+SPT)-SPT$, and then check if the sample weight is within the required 70 to 80 gram range. If the sample is within the proper weight range, its weight value is stored and the display will change to indicate "LOAD SAMPLE AND ACID". The operator responds by opening the oven door and removing the sample to a mixing bowl. The contents of an acid pillow is added to the meat sample and mixed. The acid pillow preferably contains citric acid which acts to aid in the release of fat and moisture during the subsequent cooking of the sample. After the acid is mixed with the meat sample, the sample is then placed between the sample holder 48 and cover 50 and all are loaded on the sample holder assembly 36. The door is closed and the CONT switch 30 touched.

The microprocessor then reads the combined balance weight measurement of the sample, sample holder assembly, and acid (denoted as SAM+SPT+ACD) and calculates the weight of the sample and acid, SAM+ACD=(SAM+SPT+ACD)−SPT. Following that step, the weight of the acid is calculated (ACD=(SAM+ACD)−SAM) and a comparison is made to determine if the value ACD is greater than 1 gram. If it is greater, then the value SAM+ACD is substituted in storage for the value SAM and will thus replace SAM in calculation of subsequent values by the microprocessor.

The remainder of the analysis process is followed for all meat type codes. The microprocessor now turns on the power to oven 12 and cooking of the sample is commenced. The command "IN PROCESS" is displayed in window 28 during cooking. The microprocessor continuously monitors the change in weight of the sample during cooking until the time rate of change of weight loss is less than a predetermined value. A technique for accurate determination of oven turn-off is taught in U.S. Pat. Nos. 3,890,825 and 3,916,670 incorporated herein by reference. Procedures analogous to those taught in these patents are also utilized in the present system.

However, the above-described process and apparatus improve upon the methods taught in the above patents to achieve even more accurate determinations. Because the rendered fat is collected in dish 70 which is raised off of weighing balance 10, erratic fluctuations in weight readings caused by spattering or dripping and explosions in the collected fat are avoided. Since the weight loss being monitored is the sum of vaporized moisture and rendered fat, larger values are being measured with less chance of erroneous readings. The addition of acid to salted and/or blended meat samples standardizes their characteristics for purposes of accurate sample calibration. Moreover, the use of a magnetic coupling of the stem and sample holder assembly to the weighing balance mechanism avoids possibly damaging forces and torques being transmitted to the balance.

Once it has been ascertained by the microprocessor that the rate of sample weight decrease has declined to less than a predetermined value, the oven is turned off. After turn-off, dish 70 is lowered onto sample holder assembly 36 by activation of drive means 72. The total sample weight (denoted CTF) including the weight of the sample residue, fat, sample holder, sample holder cover, and holder assembly is then measured after a 10 second delay. This delay provides for the lapse of a period of time sufficient for spattering (or dripping) and explosions of rendered fat in the dish to have substantially subsided by the time the weight measurement is taken. After this delay, the microprocessor causes the caption "REMOVE RESIDUE" to be displayed. The operator then opens the oven door 16, removes the residue from the sample holder assembly, closes the door, and touches CONT switch 30 to cause the weight (denoted FNL) of the rendered fat, cover, holder, and holder assembly to be measured and stored. The microprocessor then automatically raises dish support assembly 52 with dish 70 off of the weighing balance in preparation for the next sample analysis.

Using the measured and stored weights, stored constants, derived weights, and the equations as defined below, the microprocessor can then calculate the percentages of fat, moisture, and protein in the sample. These final percentages (TPF, TPM, and TPP) are then displayed on window 28 and printed out by the printer 23 for a permanent record of the sample.

DEFINITIONS

SPT = Weight of sample holder and cover and sample holder assembly.
S and D = SPT plus weight of collection dish.
DSH = S and D−SPT, weight of collection dish including watchglass and paper.
SAM = Initial weight of sample.
ACD = Weight of acid.
CTF = Weight at cut-off of cooking of sample residue and rendered fat plus sample holder and cover, sample holder assembly, and collection dish.
FAT = Weight of rendered fat.
MST = Weight of vaporized moisture.
RES = Weight of sample residue.
FNL = Weight of rendered fat plus sample holder and cover, sample holder assembly, and collection dish.
RPF = Raw percent fat or fat percent by weight.
RPM = Raw percent moisture or moisture percent by weight.
TPF = True percent fat—correlated value.
TPM = True percent moisture—correlated value.
TPP = True percent protein—correlated value.

EQUATIONS

DSH = S and D − SPT

SAM = (SAM + SPT) − SPT

SAM and ACD = (SAM + SPT + ACD) − SPT

ACD = (SAM + ACD) − SAM

CTF = S and D + SAM − MST

FNL = S and D + FAT

FAT = FNL − S and D

MST = S and D + SAM − CTF

RPF = FAT/SAM

RPM = MST/SAM $TPF = K_o \pm K_1(RPF) \pm K_2(RPM) \pm K_3(TEMP) \pm K_4(SALT)$ $TPM = K_o \pm K_1(RPF) \pm K_2(RPM) \pm K_3(TEMP) \pm K_4(SALT)$ $TPP = K_{1p} - K_{2p}(TPF) - TPM - SALT \%$

While the methods and apparatus described herein constitute preferred embodiments of the invention, it is to be understood that the invention is not limited to these precise methods and apparatus, and that changes may be made without departing from the scope of the invention, which is defined in the appended claims.

What is claimed is:

1. In a weighing balance assembly including means for supporting a sample to be weighed, means for weighing the sample, and a generally upright force transmitting sample support shaft connecting the sample support means and weighing means, the improvement comprising:

means secured to said weighing means magnetically coupling said sample support shaft to said weighing means while permitting transverse movement of said sample support shaft relative to said weighing means when said sample support shaft and sample supporting means are bumped or jarred, whereby damaging forces and torques are prevented from reaching said weighing means.

2. The weighing balance assembly of claim 1 in which only the lower portion of said sample support shaft is ferromagnetic.

3. The weighing balance assembly of claim 1 in which said means secured to said weighing means includes a holder having a generally cylindrically shaped recess adapted to receive one end of said sample support shaft and a permanent magnet seated in the holder.

4. The weighing balance assembly of claim 3 in which the upper edge of said holder is flared to permit said sample support shaft to rock from its normal upright position in response to bumping or jarring of the shaft and means for supporting the sample.

5. The weighing balance assembly of claim 4 in which the lower end of said sample support shaft is slotted and receives a cross pin mounted in said holder.

\* \* \* \* \*